United States Patent
Shveidel et al.

(10) Patent No.: US 10,013,200 B1
(45) Date of Patent: Jul. 3, 2018

(54) EARLY COMPRESSION PREDICTION IN A STORAGE SYSTEM WITH GRANULAR BLOCK SIZES

(71) Applicant: EMC Corporation, Hopkinton, MA (US)

(72) Inventors: Vladimir Shveidel, Pardes-Hana (IL); Kirill Shoikhet, Raanana (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 41 days.

(21) Appl. No.: 15/196,374

(22) Filed: Jun. 29, 2016

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC ............ *G06F 3/064* (2013.01); *G06F 3/061* (2013.01); *G06F 3/0626* (2013.01); *G06F 3/0673* (2013.01)

(58) Field of Classification Search
  CPC ............ G06F 2003/0691–2003/0698; G06F 3/00–3/0608; G06F 3/061–3/0625; G06F 3/0626–3/0638; G06F 3/064–3/0671; G06F 3/0673–3/0689; G06F 2212/00–2212/7211; H03M 7/30–7/3097; H04L 69/04
  See application file for complete search history.

(56) References Cited

U.S. PATENT DOCUMENTS

| | | | |
|---|---|---|---|
| 4,164,763 A | 8/1979 | Briccetti et al. |
| 4,608,839 A | 9/1986 | Tibbals, Jr. |
| 4,821,178 A | 4/1989 | Levin et al. |
| 5,319,645 A | 6/1994 | Bassi et al. |
| 5,537,534 A | 7/1996 | Voigt et al. |
| 5,539,907 A | 7/1996 | Srivastava et al. |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

Compression Speed Enhancements to LZO for Multi-core Systems; Kane et al; 24th International Symposium on Computer Architecture and High Performance Computing; Oct. 24-26, 2012; pp. 108-115 (8 pages) (Year: 2012).*

(Continued)

*Primary Examiner* — Daniel C Chappell
(74) *Attorney, Agent, or Firm* — Daly, Crowley, Mofford & Durkee, LLP

(57) ABSTRACT

Described embodiments may provide methods and systems for receiving an input/output (I/O) request by a storage system having at least one storage volume. The I/O request has associated payload data. The I/O request is performed with early prediction compression by compressing a first portion of the payload data and determining whether one or more remaining portions of the I/O request should be processed in a compressed manner or an uncompressed manner based, at least in part, upon the results of compressing the first portion of the payload data.

15 Claims, 7 Drawing Sheets

(56) References Cited

U.S. PATENT DOCUMENTS

| | | | |
|---|---|---|---|
| 5,627,995 A * | 5/1997 | Miller | G06F 3/0601 710/68 |
| 5,710,724 A | 1/1998 | Burrows | |
| 5,732,273 A | 3/1998 | Srivastava et al. | |
| 5,802,553 A * | 9/1998 | Robinson | G06F 3/0608 711/103 |
| 5,805,932 A * | 9/1998 | Kawashima | H03M 7/48 360/48 |
| 5,860,137 A | 1/1999 | Raz et al. | |
| 5,896,538 A | 4/1999 | Blandy et al. | |
| 5,903,730 A | 5/1999 | Asai et al. | |
| 5,940,618 A | 8/1999 | Blandy et al. | |
| 5,987,250 A | 11/1999 | Subrahmanyam | |
| 5,999,842 A | 12/1999 | Harrison et al. | |
| 6,182,086 B1 | 1/2001 | Lomet et al. | |
| 6,208,273 B1 * | 3/2001 | Dye | H03M 7/30 341/51 |
| 6,226,787 B1 | 5/2001 | Serra et al. | |
| 6,327,699 B1 | 12/2001 | Larus et al. | |
| 6,353,805 B1 | 3/2002 | Zahir et al. | |
| 6,470,478 B1 | 10/2002 | Bargh et al. | |
| 6,519,766 B1 | 2/2003 | Barritz et al. | |
| 6,624,761 B2 * | 9/2003 | Fallon | G06T 9/00 341/51 |
| 6,643,654 B1 | 11/2003 | Patel et al. | |
| 6,654,948 B1 | 11/2003 | Konuru et al. | |
| 6,658,471 B1 | 12/2003 | Berry et al. | |
| 6,658,654 B1 | 12/2003 | Berry et al. | |
| 6,801,914 B2 | 10/2004 | Barga et al. | |
| 6,820,218 B1 | 11/2004 | Barga et al. | |
| 6,870,929 B1 | 3/2005 | Greene | |
| 7,099,797 B1 | 8/2006 | Richard | |
| 7,143,410 B1 | 11/2006 | Coffman et al. | |
| 7,190,284 B1 * | 3/2007 | Dye | G06F 12/023 341/51 |
| 7,251,663 B1 | 7/2007 | Smith | |
| 7,315,795 B2 | 1/2008 | Homma | |
| 7,389,497 B1 | 6/2008 | Edmark et al. | |
| 7,421,681 B2 | 9/2008 | DeWitt, Jr. et al. | |
| 7,552,125 B1 | 6/2009 | Evans | |
| 7,574,587 B2 | 8/2009 | DeWitt, Jr. et al. | |
| 7,693,999 B2 | 4/2010 | Park | |
| 7,714,747 B2 * | 5/2010 | Fallon | G06T 9/00 341/50 |
| 7,774,556 B2 * | 8/2010 | Karamcheti | G06F 9/5016 711/146 |
| 7,814,218 B1 | 10/2010 | Knee et al. | |
| 7,827,136 B1 | 11/2010 | Wang et al. | |
| 7,898,442 B1 * | 3/2011 | Sovik | H03M 7/3088 341/51 |
| 7,908,436 B1 | 3/2011 | Srinivasan et al. | |
| 7,962,664 B2 * | 6/2011 | Gotch | G06F 11/3476 710/15 |
| 8,200,923 B1 | 6/2012 | Healey et al. | |
| 8,335,899 B1 | 12/2012 | Meiri et al. | |
| 8,478,951 B1 | 7/2013 | Healey et al. | |
| 8,560,926 B2 * | 10/2013 | Yeh | G06F 12/0246 365/185.33 |
| 9,037,822 B1 | 5/2015 | Meiri et al. | |
| 9,104,326 B2 | 8/2015 | Frank et al. | |
| 9,128,942 B1 | 9/2015 | Pfau et al. | |
| 9,208,162 B1 | 12/2015 | Hallak et al. | |
| 9,304,889 B1 | 4/2016 | Chen et al. | |
| 9,317,362 B2 * | 4/2016 | Khan | G06F 11/1068 |
| 9,330,048 B1 | 5/2016 | Bhatnagar et al. | |
| 9,733,854 B2 * | 8/2017 | Sharma | G06F 3/0619 |
| 9,762,460 B2 | 9/2017 | Pawlowski et al. | |
| 9,769,254 B2 | 9/2017 | Gilbert et al. | |
| 9,785,468 B2 | 10/2017 | Mitchell et al. | |
| 2001/0054131 A1 * | 12/2001 | Alvarez, II | H04N 19/42 711/105 |
| 2002/0056031 A1 | 5/2002 | Skiba et al. | |
| 2002/0133512 A1 | 9/2002 | Milillo et al. | |
| 2003/0023656 A1 | 1/2003 | Hutchison et al. | |
| 2003/0079041 A1 | 4/2003 | Parrella, Sr. et al. | |
| 2003/0131184 A1 * | 7/2003 | Kever | G06F 12/0802 711/100 |
| 2003/0145251 A1 | 7/2003 | Cantrill | |
| 2004/0030721 A1 | 2/2004 | Kruger et al. | |
| 2005/0039171 A1 | 2/2005 | Avakian et al. | |
| 2005/0071579 A1 * | 3/2005 | Luick | G06F 12/04 711/154 |
| 2005/0102547 A1 | 5/2005 | Keeton et al. | |
| 2005/0125626 A1 | 6/2005 | Todd | |
| 2005/0144416 A1 | 6/2005 | Lin | |
| 2005/0171937 A1 | 8/2005 | Hughes et al. | |
| 2005/0177603 A1 | 8/2005 | Shavit | |
| 2005/0193084 A1 | 9/2005 | Todd et al. | |
| 2006/0031653 A1 | 2/2006 | Todd et al. | |
| 2006/0031787 A1 | 2/2006 | Ananth et al. | |
| 2006/0047776 A1 | 3/2006 | Chieng et al. | |
| 2006/0070076 A1 | 3/2006 | Ma | |
| 2006/0123212 A1 | 6/2006 | Yagawa | |
| 2006/0242442 A1 | 10/2006 | Armstrong et al. | |
| 2007/0078052 A1 | 4/2007 | Aidun et al. | |
| 2007/0208788 A1 | 9/2007 | Chakravarty et al. | |
| 2007/0297434 A1 | 12/2007 | Arndt et al. | |
| 2008/0098183 A1 | 4/2008 | Morishita et al. | |
| 2008/0163215 A1 | 7/2008 | Jiang et al. | |
| 2008/0178050 A1 | 7/2008 | Kern et al. | |
| 2008/0243952 A1 | 10/2008 | Webman et al. | |
| 2008/0288739 A1 | 11/2008 | Bamba et al. | |
| 2009/0006745 A1 | 1/2009 | Cavallo et al. | |
| 2009/0030986 A1 | 1/2009 | Bates | |
| 2009/0049450 A1 | 2/2009 | Dunshea et al. | |
| 2009/0055613 A1 | 2/2009 | Maki et al. | |
| 2009/0089483 A1 | 4/2009 | Tanaka et al. | |
| 2009/0100108 A1 | 4/2009 | Chen et al. | |
| 2009/0222596 A1 | 9/2009 | Flynn et al. | |
| 2009/0319996 A1 | 12/2009 | Shafi et al. | |
| 2010/0042790 A1 | 2/2010 | Mondal et al. | |
| 2010/0088296 A1 | 4/2010 | Periyagaram et al. | |
| 2010/0190145 A1 | 7/2010 | Chu | |
| 2010/0199066 A1 | 8/2010 | Artan et al. | |
| 2010/0205330 A1 | 8/2010 | Noborikawa et al. | |
| 2010/0223619 A1 | 9/2010 | Jaquet et al. | |
| 2010/0257149 A1 | 10/2010 | Cognigni et al. | |
| 2011/0060722 A1 | 3/2011 | Li et al. | |
| 2011/0078494 A1 | 3/2011 | Maki et al. | |
| 2011/0083026 A1 | 4/2011 | Mikami et al. | |
| 2011/0099342 A1 | 4/2011 | Ozdemir | |
| 2011/0119679 A1 | 5/2011 | Muppirala et al. | |
| 2011/0161297 A1 | 6/2011 | Parab | |
| 2011/0225122 A1 | 9/2011 | Denuit et al. | |
| 2011/0289291 A1 | 11/2011 | Agombar et al. | |
| 2012/0054472 A1 | 3/2012 | Altman et al. | |
| 2012/0059799 A1 | 3/2012 | Oliveira et al. | |
| 2012/0078852 A1 | 3/2012 | Haselton et al. | |
| 2012/0124282 A1 | 5/2012 | Frank et al. | |
| 2012/0278793 A1 | 11/2012 | Jalan et al. | |
| 2012/0290546 A1 | 11/2012 | Smith et al. | |
| 2012/0290798 A1 | 11/2012 | Huang et al. | |
| 2012/0304024 A1 | 11/2012 | Rohleder et al. | |
| 2013/0031077 A1 | 1/2013 | Liu et al. | |
| 2013/0073527 A1 * | 3/2013 | Bromley | G06F 17/30156 707/692 |
| 2013/0111007 A1 | 5/2013 | Hoffmann et al. | |
| 2013/0138607 A1 | 5/2013 | Bashyam et al. | |
| 2013/0151683 A1 | 6/2013 | Jain et al. | |
| 2013/0151759 A1 | 6/2013 | Shim et al. | |
| 2013/0246354 A1 | 9/2013 | Clayton et al. | |
| 2013/0246724 A1 | 9/2013 | Furuya | |
| 2013/0265883 A1 | 10/2013 | Henry et al. | |
| 2013/0282997 A1 | 10/2013 | Suzuki et al. | |
| 2013/0332610 A1 | 12/2013 | Beveridge | |
| 2013/0339533 A1 | 12/2013 | Neerincx et al. | |
| 2014/0032964 A1 | 1/2014 | Neerincx et al. | |
| 2014/0040199 A1 | 2/2014 | Golab et al. | |
| 2014/0040343 A1 | 2/2014 | Nickolov et al. | |
| 2014/0136759 A1 | 5/2014 | Sprouse et al. | |
| 2014/0161348 A1 | 6/2014 | Sutherland et al. | |
| 2014/0195484 A1 | 7/2014 | Wang et al. | |
| 2014/0237201 A1 | 8/2014 | Swift | |

(56) References Cited

U.S. PATENT DOCUMENTS

| | | | |
|---|---|---|---|
| 2014/0297588 | A1 | 10/2014 | Babashetty et al. |
| 2014/0359231 | A1 | 12/2014 | Matthews |
| 2014/0380282 | A1 | 12/2014 | Ravindranath Sivalingam et al. |
| 2015/0006910 | A1 | 1/2015 | Shapiro |
| 2015/0088823 | A1 | 3/2015 | Chen et al. |
| 2015/0088945 | A1* | 3/2015 | Kruus ............... H03M 7/30 708/203 |
| 2015/0112933 | A1 | 4/2015 | Satapathy |
| 2015/0149739 | A1 | 5/2015 | Seo et al. |
| 2015/0205816 | A1 | 7/2015 | Periyagaram et al. |
| 2015/0249615 | A1 | 9/2015 | Chen et al. |
| 2015/0324236 | A1 | 11/2015 | Gopalan et al. |
| 2016/0042285 | A1 | 2/2016 | Gilenson et al. |
| 2016/0062853 | A1 | 3/2016 | Sugabrahmam et al. |
| 2016/0080482 | A1 | 3/2016 | Gilbert et al. |
| 2016/0188419 | A1 | 6/2016 | Dagar et al. |
| 2016/0350391 | A1 | 12/2016 | Vijayan et al. |
| 2016/0359968 | A1 | 12/2016 | Chitti et al. |
| 2016/0366206 | A1 | 12/2016 | Shemer et al. |
| 2017/0123704 | A1 | 5/2017 | Sharma et al. |
| 2017/0139786 | A1 | 5/2017 | Simon et al. |
| 2017/0161348 | A1 | 6/2017 | Araki et al. |

FOREIGN PATENT DOCUMENTS

| | | |
|---|---|---|
| WO | WO 2010/040078 | 4/2010 |
| WO | WO 2012/066528 | 5/2012 |

OTHER PUBLICATIONS

An HVS-based adaptive computational complexity reduction scheme for H.264/AVC video encoder using prognostic early mode exclusion; Shafique et al; Proceedings of the Conference on Design, Automation and Test in Europe; Mar. 8-12, 2010; pp. 1713-1718 (6 pages) (Year: 2010).*
HoPE: Hot-Cacheline Prediction for Dynamic Early Decompression in Compressed LLCs; Park et al; ACM Transactions on Design Automation of Electronic Systems, vol. 22, iss. 3, article No. 40; May 2017 (25 pages) (Year: 2017).*
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/196,447, filed Jun. 29, 2016, Shveidel, et al.
U.S. Appl. No. 15/196,472, filed Jun. 29, 2016, Shveidel.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915.
Nguyen et al., "B+ Hash Tree: Optimizing Query Execution Times for on-Disk Semantic Web Data Structures;" Proceedings of the 6$^{th}$ International Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405, 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
Response filed on May 2, 2016 to the Non-Final Office Action of Dec. 2015; for U.S. Appl. No. 14/230,405; 8 pages.
Response filed on May 2, 2016 to the Non-Final Office Action of Feb. 4, 2016; for U.S. Appl. No. 14/037,577; 10 pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
U.S. Notice of Allowance dated Feb. 21, 2018 for U.S. Appl. No. 15/196,427; 31 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Notice of Allowance dated Jan. 26, 2018 corresponding to U.S. Appl. No. 15/085,172; 8 Pages.
U.S. Notice of Allowance dated Jan. 24, 2018 corresponding to U.S. Appl. No. 15/085,181; 8 Pages.

* cited by examiner

EARLY COMPRESSION PREDICTION IN A STORAGE SYSTEM WITH GRANULAR BLOCK SIZES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

In order to save space on the storage devices and/or to reduce data transferred by the interconnect, many storage systems may employ data compression. However, performing data compression can be computation-intensive, and reduce system performance by consuming system processing resources rather than increase system performance by reducing the size of stored and/or transferred data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for receiving an input/output (I/O) request by a storage system having at least one storage volume. The I/O request has associated payload data. The I/O request is performed with early prediction compression by compressing a first portion of the payload data and determining whether one or more remaining portions of the I/O request should be processed in a compressed manner or an uncompressed manner based, at least in part, upon the results of compressing the first portion of the payload data.

Another aspect may provide a system including a processor and a memory storing computer program code that when executed on the processor causes the processor to execute an input/output (I/O) request received by a storage system having at least one storage volume. The I/O request has associated payload data. The program code is operable to perform the operations of performing the I/O request with early prediction compression by compressing a first portion of the payload data and determining whether one or more remaining portions of the I/O request should be processed in a compressed manner or an uncompressed manner based, at least in part, upon the results of compressing the first portion of the payload data.

Another aspect may provide a computer program product including a non-transitory computer readable storage medium having computer program code encoded thereon that when executed on a processor of a computer causes the computer to execute an input/output (I/O) request received by a storage system having at least one storage volume. The I/O request has associated payload data. The computer program product includes computer program code for performing the I/O request with early prediction compression by compressing a first portion of the payload data and determining whether one or more remaining portions of the I/O request should be processed in a compressed manner or an uncompressed manner based, at least in part, upon the results of compressing the first portion of the payload data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
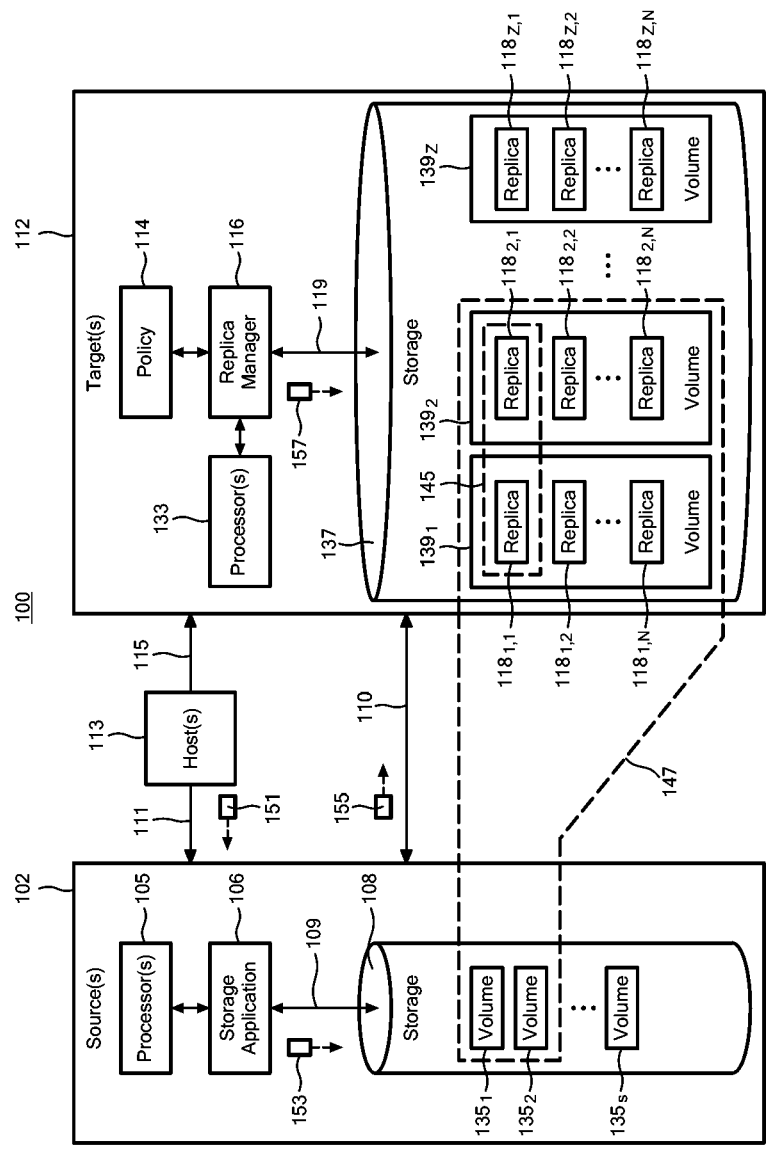
FIG. 1 is a block diagram of an example of a storage system in accordance with an illustrative embodiment.

FIG. 1 shows an example storage system 100 that may perform early compression predictions on data transfer operations, such as write operations, in accordance with illustrative embodiments.

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
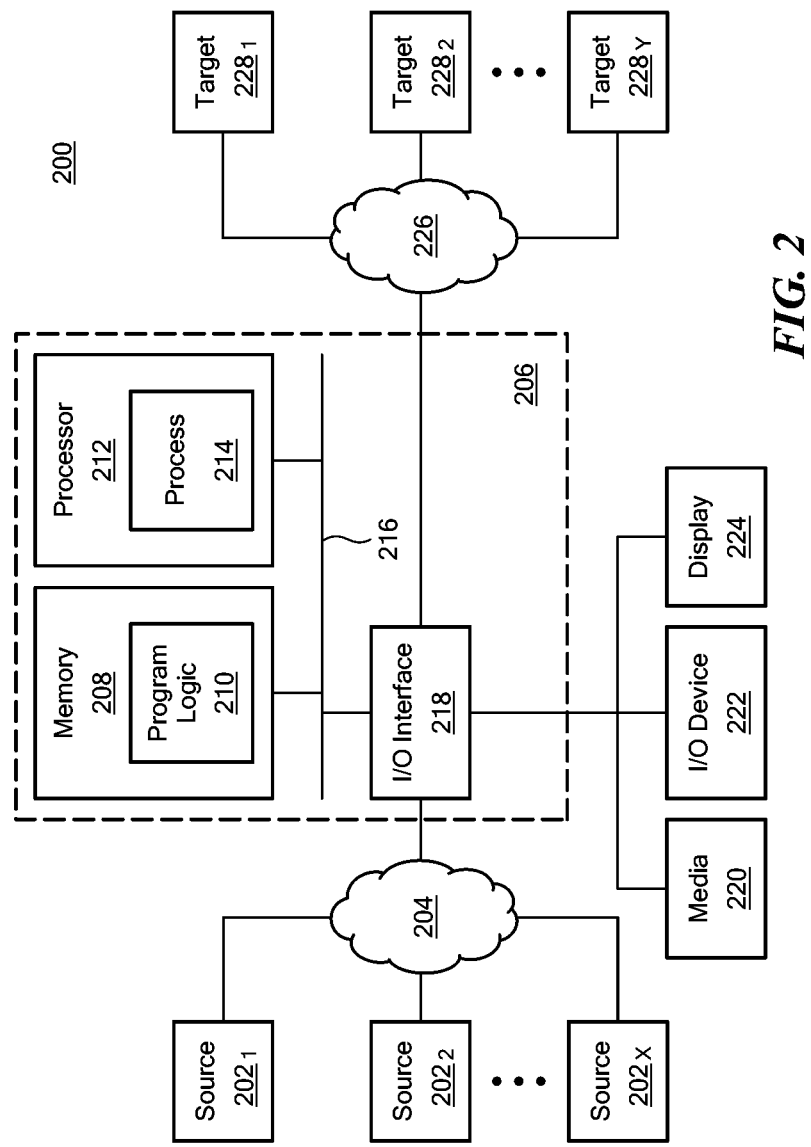
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
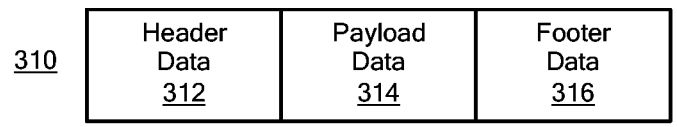
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send a write request (e.g., write request 151) to write associated data to storage 108 of source site 102. For example, write request 151 may include one or more data packets. FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 (e.g., user data), and header data 312 and/or footer data 316 may be data associated with write request 151 that may be employed by storage system 100 to process write request 151 (e.g., source and/or destination address information, error correction information, data and/or packet format information, metadata, and other information). In some embodiments, payload data 314 may be segmented into one or more payload data segments to be written to storage 108 (e.g., by one or more write operations 153). For example, if payload data 314 is 256 KB, payload data 314 may be segmented into sixteen 16 KB payload data segments to be written to storage 108. Processor(s) 105 and/or storage application 106 may then perform one or more corresponding write operations (e.g., write operation 153) to write payload data associated with the one or more data packets (e.g., one or more payload data segments) of write request 151 to storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. In some embodiments, data packet 310 may be a data packet formatted in accordance with the TCP/IP and iSCSI protocols.

Figure 3B:
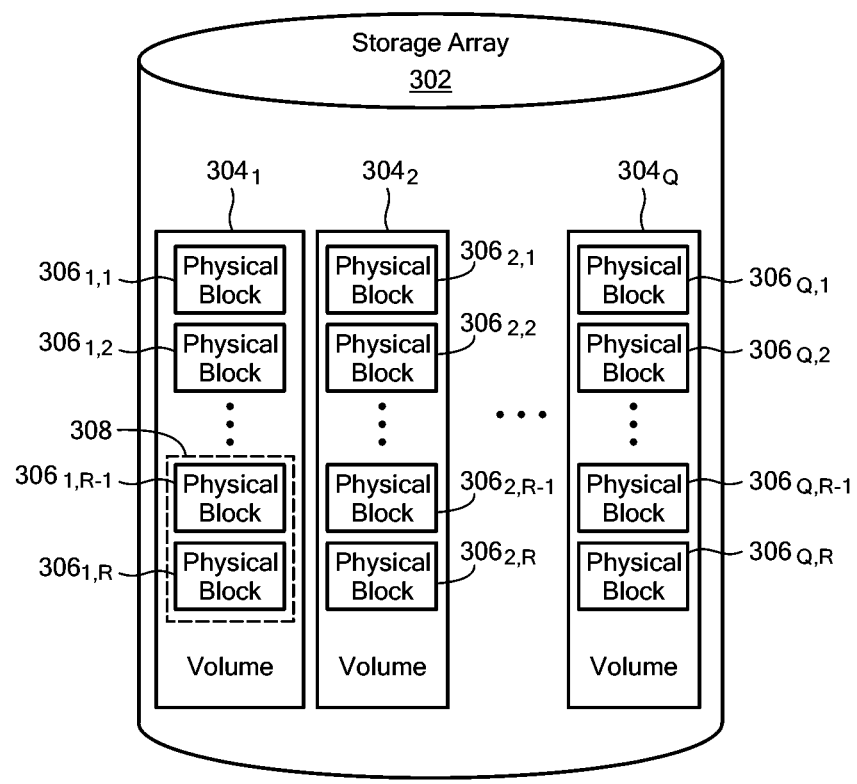
FIG. 3B is a block diagram of an example storage media of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more storage volumes $304_1$-$304_Q$ (referred to generally as storage volumes 304) where Q may be a positive integer. In illustrative embodiments, storage volumes 304 may include one or more magnetic drives such as hard disk drives (HDDs), one or more solid state drives (SSDs) such as flash drives, a hybrid magnetic and solid state drive, etc., or a combination thereof. Each storage volume may include a plurality of physical blocks, referred to generally as physical blocks 306. For example, storage volume $304_1$ may include physical blocks $306_{1,1}$-$306_{1,R}$, where R may be a positive integer. In general, a physical block is an addressable unit where data may be written to and/or read from storage volume 304. In some embodiments, a physical block 306 may correspond to a sector or a page of a given storage volume 304. A sector or a page may be the smallest addressable unit of the storage volume 304 (e.g., the smallest unit of data that can be written or read). In other embodiments, a physical block 306 may correspond to a defined group of sectors or pages of storage volume 304. Further, in some embodiments, one or more physical blocks 306 may be associated with a given logical block, shown generally as logical block 308. In some embodiments, payload data 314 of FIG. 3A may be segmented into one or more payload data segments based upon the physical block size(s) of storage array 302.

Figure 3C:
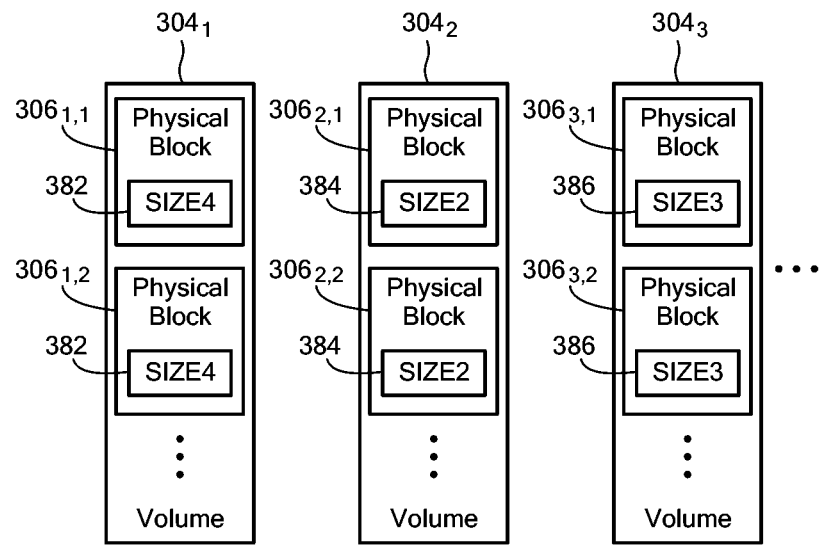
FIG. 3C is a block diagram of data stored in physical blocks of the storage system of FIG. 1 in accordance with an illustrative embodiment.

Each physical block 306 may have a defined physical block size. For example, in solid state drives (SSDs), physical block sizes may be 16 KB, 8 KB, 4 KB, 2 KB, 512B, and 256B. In some embodiments, each volume $304_1$-$304_Q$ of storage array 302 may have an associated physical block size. For example, as shown in FIG. 3C, each physical block $306_{1,1}$-$306_{1,R}$ of storage volume $304_1$ may have an associated block size. For example, each physical block 306 may have an associated block size, which may be the same block size, or may be different block sizes. Similarly, each physical block $306_{2,1}$-$306_{2,R}$ of storage volume $304_2$ may have an associated block size (e.g., each physical block $306_{2,1}$-$306_{2,R}$ may have the same block size), and so forth, for each one of storage volumes $304_1$-$304_Q$. In the illustrative embodiment shown in FIG. 3C, physical blocks $306_{1,1}$-$306_{1,R}$ may have a physical block size 382, which may be a first block size (e.g., SIZE 4), physical blocks $306_{2,1}$-$306_{2,R}$ may have a physical block size 384, which may be a second block size (e.g., SIZE 2), physical blocks $306_{3,1}$-$306_{3,R}$ may have a physical block size 386, which may be a third block size (e.g., SIZE 3), and so on. Each physical block 306 may store data blocks having a size less than or equal to the physical block size.

In some embodiments, one or more of storage volumes $304_1$-$304_Q$ may employ the same block size, while, in some embodiments, each of storage volumes $304_1$-$304_Q$ may employ different block sizes. For example, in illustrative embodiments, storage volume $304_1$ may employ a first block size, storage volume $304_2$ may employ a second block size, and so forth. In some embodiments, each storage volume $304_1$-$304_Q$ may employ a unique block size, while in other embodiments, two or more of storage volumes $304_1$-$304_Q$ may employ a common block size. In an embodiment, storage volumes $304_1$-$304_Q$ may be implemented such that storage array 302 supports a plurality of granular block sizes.

For example, in an illustrative embodiment, one or more of storage volumes $304_1$-$304_Q$ may be implemented having a first block size (e.g., SIZE0), one or more of storage volumes $304_1$-$304_Q$ may be implemented having a second block size (e.g., SIZE1), one or more of storage volumes $304_1$-$304_Q$ may be implemented having a third block size (e.g., SIZE2), one or more of storage volumes $304_1$-$304_Q$ may be implemented having a fourth block size (e.g., SIZE3), and one or more of storage volumes $304_1$-$304_Q$ may be implemented having a fifth block size (e.g., SIZE4). In one embodiment, SIZE0>SIZE1>SIZE2>SIZE3>SIZE4. In other words, SIZE4 may be the smallest block size (e.g., SIZE4 may correspond to a sector or a page), and SIZE0 may be the largest block size (e.g., SIZE0 may correspond to the size of logical block 308).

Referring back to FIG. 1, storage system 100 may employ data compression to compress data written to storage 108 and/or storage 137 to reduce the physical storage space consumed by written data. The nature of a given set of data set may determine the overall compressibility rate. Compression reduces the total amount of physical data that needs to be written to storage 108 and/or storage 137. In some embodiments, for example embodiments employing SSDs, reducing the data written to storage 108 and/or storage 137 may also reduce the write amplification of the SSDs, thereby improving the endurance of the SSDs. Further, in some embodiments, data compression may operate in conjunction with data deduplication, further reducing data written to storage 108 and/or storage 137.

For example, processor(s) 105 and/or storage application 106 may receive write request 151 as one or more packets, and each packet may include corresponding payload data (e.g., payload data 314 of FIG. 3A). Processor(s) 105 and/or storage application 106 may compress the payload data associated with write request 151, such that one or more write operations 153 write compressed payload data to storage 108. Similarly as for write request 151, processor(s) 133 and/or replica manager 116 may receive replica 155 as one or more data packets, and each packet may include corresponding payload data (e.g., payload data 314 of FIG. 3A). Processor(s) 133 and/or replica manager 116 may compress the payload data associated with replica 155, such that one or more write operations 157 write compressed payload data to storage 137.

As described in regard to FIG. 3B, storage 108 and/or storage 137 may be implemented by storage array 302. Storage array 302 may operate with granular fixed-size blocks. In some embodiments, data compression may be performed on data to be stored in storage array 302 (e.g., payload data 314 of FIG. 3A) based upon the physical block sizes (e.g., 306) supported by the volumes (e.g., 304) of storage array 302. For example, storage array 302 may support one or more different-size physical blocks where compressed input data can be stored. In an embodiment, storage array 302 may support physical block sizes SIZE0, SIZE1, SIZE2, SIZE3, and SIZE4, where SIZE0>SIZE1>SIZE2>SIZE3>SIZE4 (for example, SIZE0 may be 16 KB, SIZE1 may be 8 KB, SIZE2 may be 4 KB, SIZE3 may be 2 KB, and SIZE4 may be 512 B). For additional examples, see copending U.S. patent application Ser. No. 15/086,565 filed Mar. 31, 2016 and entitled "Method and System for Choosing an Optimal Compression Algorithm," the teachings of which are incorporated herein by reference in their entirety.

In illustrative embodiments, if payload data 314 can be compressed to SIZE4 (or less, for example if payload data 314 is already smaller than SIZE4 or can be compressed to less than SIZE4), the payload data may be stored in a physical block having block size SIZE4. Otherwise, if payload data 314 can be compressed to SIZE3 (or less) but not SIZE4 or less, the payload data may be stored in a physical block having block size SIZE3, and so forth, for the various granular block sizes. If payload data 314 cannot be compressed to SIZE1 or less, the payload data may be stored, uncompressed, in a physical block having block size SIZE0. In some embodiments, block size SIZE0 (e.g., the largest block size) may be the same as the size of logical block 308.

In an illustrative embodiment, if payload data cannot be compressed to SIZE1 or less, the payload data may be stored, uncompressed, in a physical block of storage array 302 having a size of SIZE0. In general, it may not be easily determined whether, and by how much, a given set of data can be compressed without compressing the given set of data and determining results of the compression. Further, compression operations may consume system resources such as processor capacity (e.g., of processor(s) 105 and/or processor(s) 133 of FIG. 1).

Illustrative embodiments may employ a compression operation with early compression prediction. In some embodiments, early compression prediction may determine whether a compression operation will reach one or more compression thresholds, and may stop performing compression if the compression operation will not successfully reach at least one of the compression thresholds (i.e., if the size of a given data set is unlikely to reach a compression threshold after performing the compression operation). Such embodiments will reduce system resource consumption (e.g., capacity of processor(s) 105 and/or processor(s) 133 of FIG. 1) by reducing an amount of time spent performing compression operations on data sets that are uncompressible or cannot be sufficiently compressed.

Some embodiments may provide compression prediction that may predict whether a compression operation on a given set of payload data is unlikely to successfully compress the given set of payload data beyond a compression threshold. For example, if the input payload data is 8 KB and SIZE1 is 6 KB, some embodiments may perform compression on a first amount of payload data, such as 2 KB. After processing the first amount of payload data, a likelihood may be determined whether the compression operation will reach at least one of compression threshold. In some embodiments, the one or more compression thresholds may be set based upon the one or more physical block sizes (e.g., physical block sizes 382, 384, 386, as shown in FIG. 3C) supported by storage array 302 (e.g., a first compression threshold is set based upon SIZE1, a second compression threshold is set based upon SIZE2, etc.).

For example, if, after processing the first 2 KB of the 8 KB input payload data, the compression operation has only reduced the 2 KB payload data to 1.9 KB of compressed payload data, the achieved compression ratio is 1−(1.9/2) =5%. Based upon the achieved compression ratio, it may be determined that reaching one or more compression thresholds is unlikely. For example, achieving only a 5% compression ratio for the entire 8 KB payload data would reduce the payload data from 8 KB to 7.6 KB, which may not be small enough to fit within a next smaller block size of storage array 302 (e.g., physical block sizes 382, 384, 386, as shown in FIG. 3C). Thus, it may be desirably to avoid spending time and system resources to compress the full 8 KB of payload data and instead store the payload data uncompressed on storage array 302.

Figure 3D:
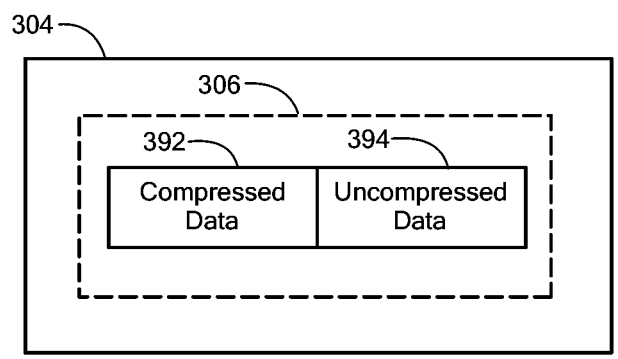
FIG. 3D is another block diagram of data stored in physical blocks of the storage system of FIG. 1 in accordance with an illustrative embodiment.

Some illustrative embodiments may predict whether the compression operation will compress the data beyond a smallest data size. For example, if a smallest physical block size of storage array 302 is SIZE4, time spent compressing payload data to be smaller than SIZE4 wastes system resources (e.g., capacity of processor(s) 105 and/or processor(s) 133 of FIG. 1), since SIZE4 is the smallest addressable portion of storage array 302 and further compression does not yield additional storage capacity of storage array 302. In some illustrative embodiments, if a given set of payload data is SIZE4 or smaller (e.g., the payload data fits within a physical block of SIZE4) at any point during the compression operation, the compression operation may be completed and the payload data may be written to storage array 302. For example, if the compression algorithm compressions only a first portion of the payload data before the size of the payload data reaches SIZE4, the payload data may be written to storage array 302 as partially compressed data (e.g., 392) and partially uncompressed data (e.g., 394), as shown in FIG. 3D. Thus, in some embodiments, the compression operation may compression all, none, or only a portion of the payload data, which may reduce consumption of system resources (e.g., capacity of processor(s) 105 and/or processor(s) 133 of FIG. 1).

In some embodiments, an aggressiveness of compression prediction may be adjusted, for example based upon one or more operating conditions of the storage system. For example, based on current system conditions and system (or user) requirements, described embodiments may determine which early compression thresholds to employ, and/or one or more settings to employ for the compression operation. For example, a current processor usage may be determined for one or more processors of the storage system (e.g., processor(s) 105 and/or processor(s) 133 of FIG. 1) and compared to a processor utilization threshold. Further, a current available storage capacity may be determined of storage 108 and/or storage 137 and compared to a free space threshold. Other system operating conditions may also be determined, for example utilization levels of one or more of links 109, 110, 111, 115 and/or 119 and compared to respective thresholds.

Since there may be competing requirements for system performance, for example: (1) minimization of processor utilization, (2) minimization of communication link usage, (3) minimization of internal data transfers (e.g., within source 102 and/or target 112), (3) maximization of communication link throughput, among others, described embodiments may adjust the aggressiveness of compression prediction. For example, as shown in Table 1, when the processor use is low (e.g., lower than the processor utilization threshold) and/or the available storage capacity is low (e.g., lower than the free space threshold), illustrative embodiments may employ early compression thresholds that allow additional compression to be performed before stopping the compression operation. Alternatively, if the processor use is high (e.g., higher than the processor utilization threshold) and/or the available storage capacity is high (e.g., higher than the free space threshold), illustrative embodiments may employ early compression thresholds that reduce the amount of compression performed before stopping the compression operation.

TABLE 1

| processor condition | storage condition | compression operation |
| --- | --- | --- |
| low (e.g., below processor utilization threshold) | low (e.g., lower than free space threshold) | high compression |
| low (e.g., below processor utilization threshold) | high (e.g., at or above free space threshold) | intermediate compression |
| high (e.g., above processor utilization threshold) | low (e.g., lower than free space threshold) | intermediate compression |
| high (e.g., above processor utilization threshold) | high (e.g., at or above free space threshold) | low compression |

Figure 4:
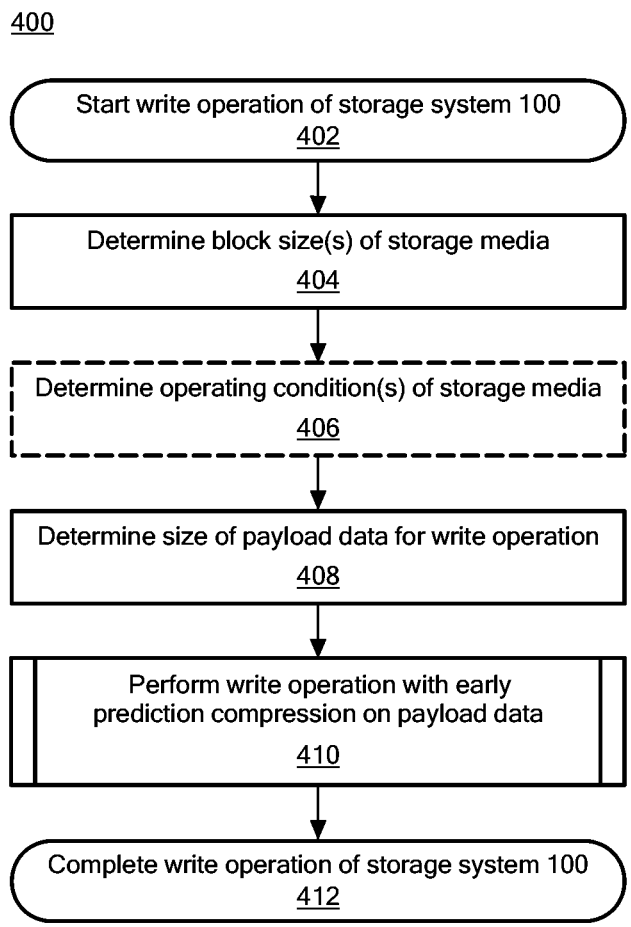
FIG. 4 is a flow diagram of an example of a process to perform a write operation to a storage media in accordance with an illustrative embodiment.

Referring to FIG. 4, process 400 is an example of a process to perform at least a part of a write operation of storage system 100 in accordance with illustrative embodiments. At block 402, the write operation of storage system 100 may begin, for example when a write request (e.g., write request 151) may be received from a host (e.g., one of hosts 113). At block 404, one or more block sizes (e.g., size(s) of physical blocks 306) of storage array 302 (e.g., storage 108 and/or storage 137) may be determined. For example, in an illustrative embodiment, the physical block sizes SIZE0, SIZE1, SIZE2, SIZE3, and SIZE4 may be determined.

At block 406, one or more operating conditions of storage system 100 may be determined. For example, in an illustrative embodiment, a current processor utilization may be determined (e.g., of processor(s) 105 and/or processor(s) 133), a current available storage capacity may be determined (e.g., of storage 108 and/or storage 137), and/or other system operating conditions may be determined. At block 408, a size of payload data associated with the write operation may be determined (e.g., a size of payload data 314 of FIG. 3A). At block 410, the write operation may be performed with early prediction compression (e.g., to write the payload data to storage 108 and/or storage 137). Block 410 will be described in greater detail in regard to FIG. 5. At block 412, the write operation may complete.

Figure 5:
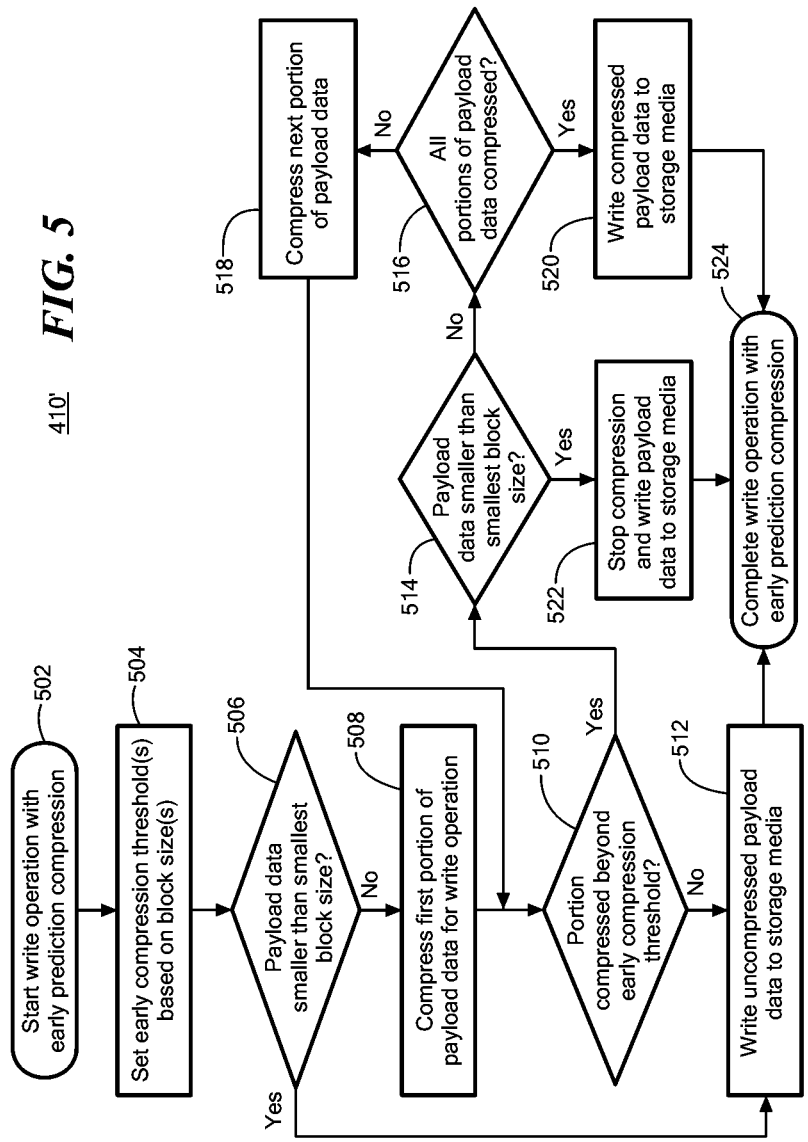
FIG. 5 is a flow diagram of an example of a process to perform early prediction compression for the write operation of FIG. 4 in accordance with an illustrative embodiment.

Referring to FIG. 5, process 410' shows an illustrative embodiment of a write operation with early prediction compression. At block 502, process 410' may begin. At block 504, one or more early compression thresholds may be set, for example based upon the block sizes determined at block 404 of FIG. 4. In some embodiments, at block 504, the one or more early compression thresholds may also be set based upon the one or more system operating conditions determined at block 406. For example, in an illustrative embodiment, at block 504, an early compression threshold may be set based upon one of the block sizes supported by storage 108 and/or storage 137, for example, one of the physical block sizes SIZE0, SIZE1, SIZE2, SIZE3, and SIZE4. In an embodiment, SIZE0 is the largest block size, SIZE4 is the smallest block size, and one or more of SIZE1, SIZE2, and SIZE3 may be employed to determine early compression threshold(s).

In embodiments that determine operating conditions of the storage system, if, at block 406, processor(s) 105 are not utilized beyond a threshold and/or storage 108 is filled beyond a threshold, the early compression threshold may be set more aggressively (e.g., to a relatively smaller size value) to attempt to use less storage space. For example, the early compression threshold may be set based upon SIZE3. However, if, at block 406, processor(s) 105 are utilized beyond a threshold and/or storage 108 is not filled beyond a threshold, the early compression threshold may be set less aggressively (e.g., to a relatively larger size value) to attempt to use less processor resources. For example, the early compression threshold may be set based upon SIZE1.

At block 506, if the payload data associated with the write operation is already smaller than a smallest block size of storage 108 and/or storage 137 (e.g., smaller than SIZE4), then at block 512, the uncompressed payload data may be written to the storage without consuming processor capacity (e.g., of processor(s) 105 and/or processor(s) 133) to compress the payload data. At block 524, process 410' may complete.

If, at block 506, the payload data associated with the write operation is not smaller than the smallest block size, then at block 508, a first portion of the payload data may be compressed. For example, in an illustrative embodiment, at block 508 a first 25% of the payload data may be compressed. At block 510, it may be determined whether the first portion of the payload data was successfully compressed beyond at least one of the early compression thresholds set at block 504, for example based upon the compression ratio achieved for the first portion of payload data.

If, at block 510, the first portion of the payload data was not compressed beyond at least one of the early compression thresholds, then at block 512, the uncompressed payload data may be written to storage (e.g., storage 108 and/or storage 137). If, at block 510, the first portion of the payload data was compressed beyond at least one of the early compression thresholds, then at block 514, if the payload data associated with the write operation is smaller than the smallest block size of storage 108 and/or storage 137 (e.g., smaller than SIZE4), then at block 522, the payload data may be written to the storage without further compression. At block 524, process 410' may complete. If, at block 514, payload data associated with the write operation is not smaller than the smallest block size of storage 108 and/or storage 137 (e.g., smaller than SIZE4), then at block 516, if there are one or more additional portions of the payload data to compress, at block 518, at least one next portion of the payload data may be compressed, and process 410' may return to block 510. If, at block 516, there are no more additional portions of the payload data to compress, at block 520, the compressed payload data is written to the storage (e.g., storage 108 and/or storage 137), and at block 524, process 410' may complete.

Figure 6:
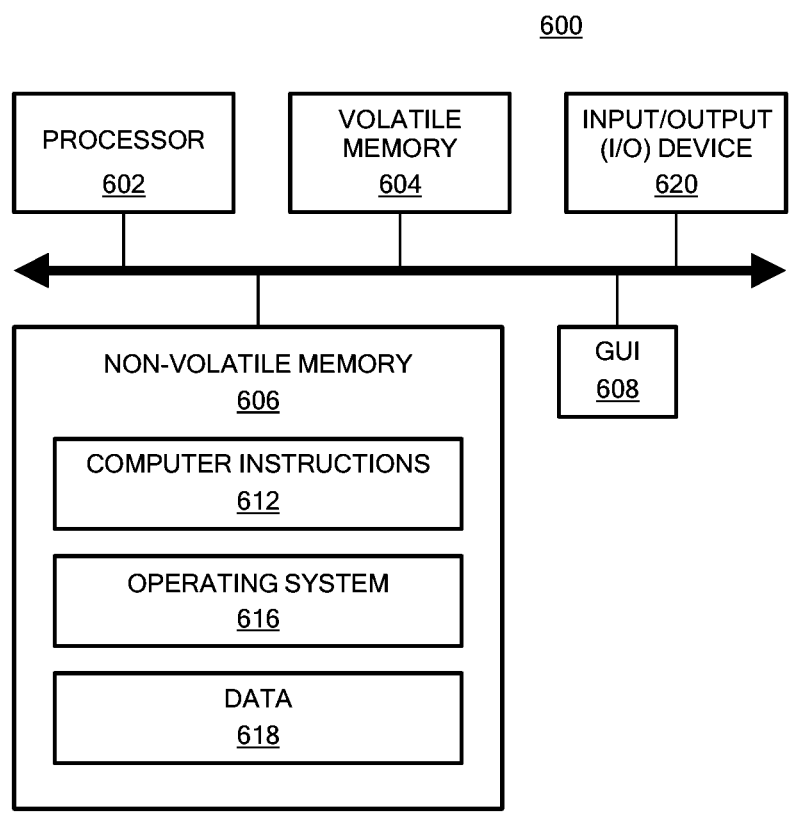
FIG. 6 is a block diagram of an example of a hardware device that may perform at least a portion of the processes in FIGS. 4 and 5.

Referring to FIG. 6, in some embodiments, source site 102 and/or target site 112 may be implemented as one or more computers. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of processes 400 and 410' (FIGS. 4 and 5). Program code may be applied to data entered using an input device of GUI 608 or received from I/O device 620.

Processes 400 and 410' (FIGS. 4 and 5) are not limited to use with the hardware and software of FIG. 6 and may find applicability in any computing or processing environment and with any type of machine or set of machines that may be capable of running a computer program. Processes 400 and 410' may be implemented in hardware, software, or a combination of the two.

The processes described herein are not limited to the specific embodiments described. For example, processes 400 and 410' are not limited to the specific processing order shown in FIGS. 4 and 5. Rather, any of the blocks of processes 400 and 410' may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
    receiving an input/output (I/O) request by a storage system having at least one storage volume, the I/O request having associated payload data;
    performing the I/O request with early prediction compression by:
        compressing a first portion of the payload data; and
        determining whether one or more remaining portions of the I/O request should be processed in a compressed manner or an uncompressed manner based, at least in part, upon the results of compressing the first portion of the payload data,
    wherein if a utilization level of the one or more processors is below a processor utilization threshold, setting a compression threshold value to increase compression of the payload data; and
    if the utilization level of the one or more processors is at or above a processor utilization threshold, setting the compression threshold value to decrease compression of the payload data; and performing the I/O request to the at least one storage volume with the payload data uncompressed if an achieved compression ratio of the first portion of the payload data has not reached a compression threshold value, wherein the I/O request comprises a request to write data to the at least one storage volume and wherein determining one or more block sizes of the at least one storage volume and a size of payload data associated with the I/O request further comprises, if the size of the payload data associated with the I/O request is greater than a largest of the one or more block sizes of the at least one storage volume: segmenting the payload data associated with the I/O request into two or more payload data segments, each payload data segment having a size associated with the largest of the one or more block sizes; and performing the I/O request with early prediction compression for each of the two or more payload data segments.

2. The method of claim 1, further comprising:
    determining one or more block sizes of the at least one storage volume and a size of the payload data associated with the I/O request; and
    if the size of the payload data is less than a smallest one of the one or more block sizes, performing the I/O request to the at least one storage volume with the payload data uncompressed.

3. The method of claim 1, further comprising, if an achieved compression ratio of the first portion of the payload data has reached the compression threshold value:
    if the payload data is smaller than a given one of the one or more block sizes, performing the I/O request to the at least one storage volume with the first portion of the payload data compressed, and one or more additional portions of the payload data uncompressed.

4. The method of claim 2, further comprising, if the payload data is not smaller than a given one of the one or more block sizes, compressing one or more additional portions of the payload data.

5. The method of claim 1, further comprising, based upon one or more operating conditions of the storage system, adjusting the compression threshold value.

6. The method of claim 5, further comprising:
    if a free space level of the at least one storage volume is below a free space threshold, setting the compression threshold value to increase compression of the payload data; and
    if the free space level of the at least one storage volume is at or above a free space threshold, setting the compression threshold value to decrease compression of the payload data.

7. The method of claim 1, further comprising, based upon one or more operating conditions of the storage system, adjusting a size of the first portion of the payload data.

8. A system comprising:
    a processor; and
    memory storing computer program code that when executed on the processor causes the processor to execute an input/output (I/O) request received by a storage system having at least one storage volume operable to perform the operations of:
        receiving an input/output (I/O) request by a storage system having at least one storage volume, the I/O request having associated payload data;
        performing the I/O request with early prediction compression by:
            compressing a first portion of the payload data; and
            determining whether one or more remaining portions of the I/O request should be processed in a compressed manner or an uncompressed manner based, at least in part, upon the results of compressing the first portion of the payload data,
wherein if a utilization level of the one or more processors is below a processor utilization threshold, setting a compression threshold value to increase compression of the payload data; and
if the utilization level of the one or more processors is at or above a processor utilization threshold, setting the compression threshold value to decrease compression of the payload data; and performing the I/O request to the at least one storage volume with the payload data uncompressed if an achieved compression ratio of the first portion of the payload data has not reached a compression threshold value, wherein the I/O request comprises a request to write data to the at least one storage volume and wherein determining one or more block sizes of the at least one storage volume and a size of payload data associated with the I/O request further comprises, if the size of the payload data associated with the I/O request is greater than a largest of the one or more block sizes of the at least one storage volume: segmenting the payload data associated with the I/O request into two or more payload data segments, each payload data segment having a size associated with the largest of the one or more block sizes; and performing the I/O request with early prediction compression for each of the two or more payload data segments.

9. The system of claim 8, wherein the computer program code is further operable to perform the operations of, if the achieved compression ratio of the first portion of the payload data has reached the compression threshold value:
if the payload data is smaller than a given one of the one or more block sizes, performing the I/O request to the at least one storage volume with the first portion of the payload data compressed, and one or more additional portions of the payload data uncompressed; and
if the payload data is not smaller than a given one of the one or more block sizes, compressing one or more additional portions of the payload data.

10. The system of claim 8, wherein the computer program code is further operable to perform the operations of:
determining one or more block sizes of the at least one storage volume and a size of the payload data associated with the I/O request;
if the size of the payload data is less than a smallest one of the one or more block sizes, performing the I/O request to the at least one storage volume with the payload data uncompressed; and
if the payload data is not smaller than a given one of the one or more block sizes, compressing one or more additional portions of the payload data.

11. The system of claim 8, wherein the computer program code is further operable to perform the operation of, based upon one or more operating conditions of the storage system, adjusting the compression threshold value.

12. The system of claim 11, wherein the computer program code is further operable to perform the operations of, at least one of:
if a free space level of the at least one storage volume is below a free space threshold, setting the compression threshold value to increase compression of the payload data; and
if the free space level of the at least one storage volume is at or above a free space threshold, setting the compression threshold value to decrease compression of the payload data.

13. The system of claim 8, wherein the computer program code is further operable to perform the operation of, based upon one or more operating conditions of the storage system, adjusting a size of the first portion of the payload data.

14. A computer program product including a non-transitory computer readable storage medium having computer program code encoded thereon that when executed on a processor of a computer causes the computer to execute an input/output (I/O) request received by a storage system having at least one storage volume, the computer program product comprising:
computer program code for receiving the input/output (I/O) request, the I/O request having associated payload data;
computer program code for performing the I/O request with early prediction compression by:
compressing a first portion of the payload data; and
determining whether one or more remaining portions of the I/O request should be processed in a compressed manner or an uncompressed manner based, at least in part, upon the results of compressing the first portion of the payload data;
wherein if a utilization level of the one or more processors is below a processor utilization threshold, setting a compression threshold value to increase compression of the payload data; and
if the utilization level of the one or more processors is at or above a processor utilization threshold, setting the compression threshold value to decrease compression of the payload data; and computer program code for performing the I/O request to the at least one storage volume with the payload data uncompressed if an achieved compression ratio of the first portion of the payload data has not reached a compression threshold value/wherein the I/O request comprises a request to write data to the at least one storage volume and wherein determining one or more block sizes of the at least one storage volume and a size of payload data associated with the I/O request further comprises, if the size of the payload data associated with the I/O request is greater than a largest of the one or more block sizes of the at least one storage volume: segmenting the payload data associated with the I/O request into two or more payload data segments, each payload data segment having a size associated with the largest of the one or more block sizes; and performing the I/O request with early prediction compression for each of the two or more payload data segments.

15. The computer program product of claim 14, further comprising:
computer program code for adjusting the compression threshold value based upon one or more operating conditions of the storage system;
computer program code for setting the compression threshold value to increase compression of the payload data if a free space level of the at least one storage volume is below a free space threshold; and
computer program code for setting the compression threshold value to decrease compression of the payload data if the free space level of the at least one storage volume is at or above a free space threshold.

* * * * *